Dec. 1, 1931. A. R. JOHNSON 1,833,903
HEATING APPARATUS FOR MOTOR VEHICLES
Filed April 5, 1930
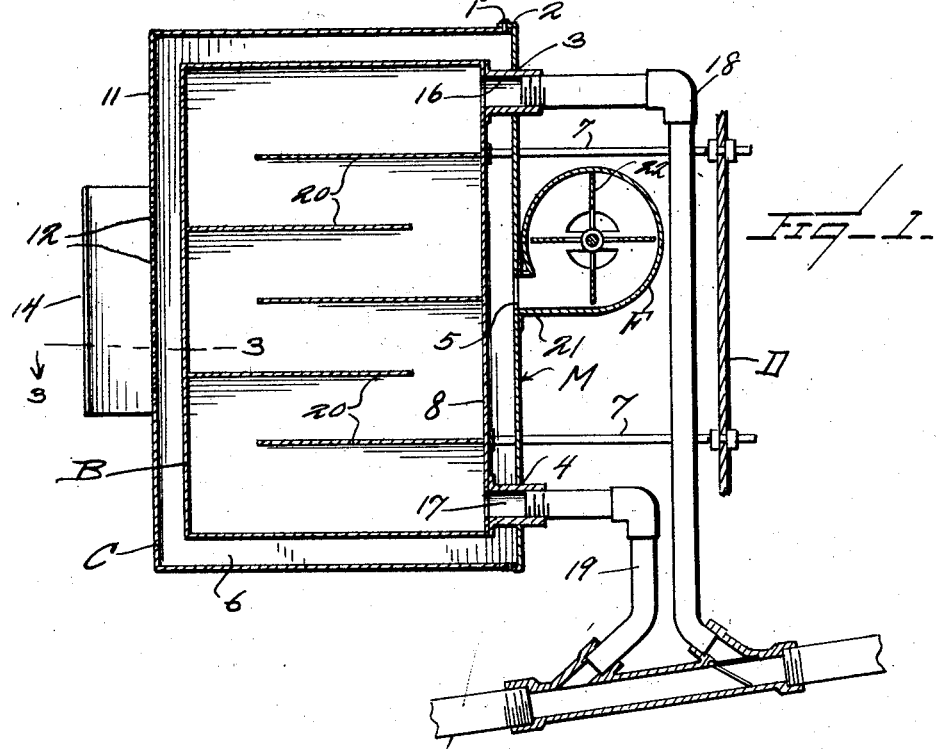
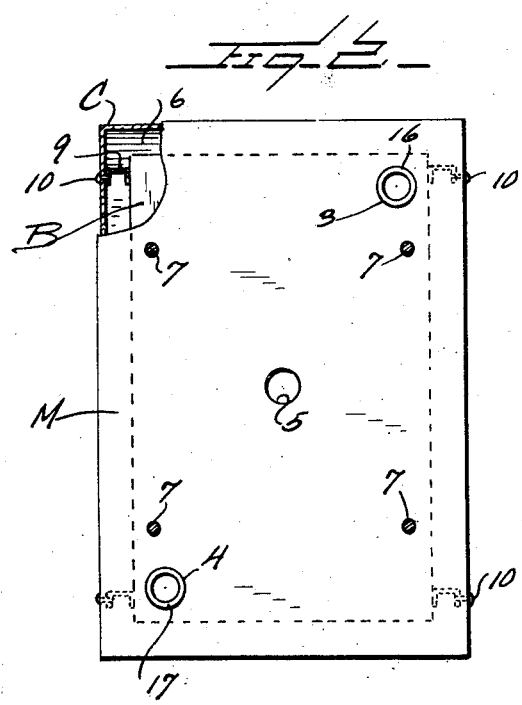
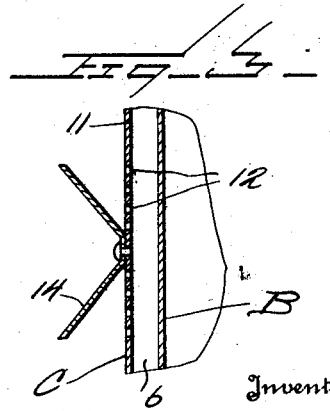
Inventor
A. R. Johnson
By Watson E. Coleman
Attorney Patented Dec. 1, 1931

1,833,903

UNITED STATES PATENT OFFICE

AMOS R. JOHNSON, OF MINNEAPOLIS, MINNESOTA, ASSIGNOR OF ONE-FOURTH TO ALF A. SUNDEEN, OF MINNEAPOLIS, MINNESOTA

HEATING APPARATUS FOR MOTOR VEHICLES

Application filed April 5, 1930. Serial No. 441,929.

This invention relates to heating apparatus for motor vehicles, and it is an object of the invention to provide a device of this kind wherein the exhaust of the engine is employed as the heating medium.

The invention also has for an object to provide a device of this kind wherein air is caused to discharge within the body of the vehicle after being heated by the exhaust from the engine.

Another object of the invention is to provide a device of this kind comprising a casing having suitable discharge together with a heating medium within the casing, and means for forcing air around the medium within the casing and out through the discharge thereof.

A still further object of the invention is to provide a device of this kind with means whereby the heated air as discharged is effectively deflected.

The invention consists in the details of construction and in the combination and arrangement of the several parts of my improved heating apparatus for a motor vehicle whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view partly in vertical section and partly in elevation illustrating a heating apparatus for motor vehicles constructed in accordance with an embodiment of my invention;

Figure 2 is a view in rear elevation of the device as illustrated in Figure 1 with certain of the parts omitted and a portion broken away;

Figure 3 is a detailed sectional view taken substantially on the line 3—3 of Figure 1.

As herein disclosed, my improved heater comprises a casing C of desired configuration and dimensions and which has its rear face open. This rear open face, however, is adapted to be closed by a slip closure member M held in applied position by screws 1 or the like coacting with the side flanges 2 of the member M and the adjacent side walls of the casing C. The closure member M in its upper portion is provided with an opening 3 and in its lower portion with an opening 4 and substantially at its axial center the member M is provided with a further opening 5.

Positioned within the casing C is a box or core B, the walls of which being of metal or kindred material which will readily radiate heat. This box or core B is of such dimensions as to be substantially entirely surrounded within the casing C by an air chamber or space 6.

The box or core B is maintained in desired applied position within the casing C by the rods 7 which are disposed through the applied closure member M and welded or otherwise anchored to the rear wall 8 of the box or core B. These rods 7, as herein disclosed, are of such length to permit the outer end portions thereof to be effectively engaged with the dash D so that the heater proper will be supported within the body of the car by the dash.

The side walls of the box or core B have welded or otherwise secured thereto the plates 9 bridging the space between the box or core B and casing C and providing means whereby screws 10 or the like may be employed to maintain the box or core B and casing C in desired assembled relation.

The front wall 11 of the casing C is provided with discharge openings 12 for the air passing through the casing C around the box or core B and in order that the air as discharged may be effectively distributed I secure to the outer face of the front wall 11 of the casing C the exterior deflecting plate 14, the same being herein disclosed as substantially in the form of a V in cross section with its apex portion secured vertically along the wall 11 at the central part of the perforated portion of said wall.

The rear wall 8 of the box or core B is provided with a suitably positioned inlet nipple 16 and exhaust nipple 17, said nipples being snugly disposed respectively through the openings 3 and 4 in the closure member M. The nipple 16 is in communication through the pipe line 18 with the exhaust pipe P of the engine while the nipple 17 has leading therefrom as may be preferred an exhaust or carry-off pipe 19.

The interior of the box or core B is provided therein with the baffle plates 20 projecting inwardly from opposed walls of said box or core B with adjacent baffle plates oppositely disposed. These baffle plates result in the exhaust gases entering the box or core B to pass therethrough in a tortuous path, thus assuring a maximum of heating efficiency for the air circulating within the casing C around the box or core B.

In communication with the opening 5 is a discharge spout 21 of a fan casing F and working in a conventional manner within the casing F is a fan 22. This fan 22 may be driven by an electric motor or in any manner preferred.

It is also to be noted that by providing within the box or core B the baffle plates 20, said box or core also serves as a muffler.

From the foregoing description it is thought to be obvious that a heating apparatus for a motor vehicle constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

A heater of the class described comprising a casing, a box supported within the casing, said box being of such dimensions to provide within the casing an air space substantially surrounding the box, a wall of the casing being provided with an air discharge opening, fan means connected to said casing for forcing air through the casing around the box and out through the discharge opening, said fan means comprising a fan casing extending outwardly of one wall of the casing and a plurality of blades rotatably mounted in said fan casing and adapted upon rotation thereof to force air into said casing and outwardly of said discharge opening means for circulating a heated fluid medium through the box, and means for deflecting in different directions the air passing out through the discharge opening in the casing.

In testimony whereof I hereunto affix my signature.

AMOS R. JOHNSON.